weight: 2,728,754
Patented Dec. 27, 1955

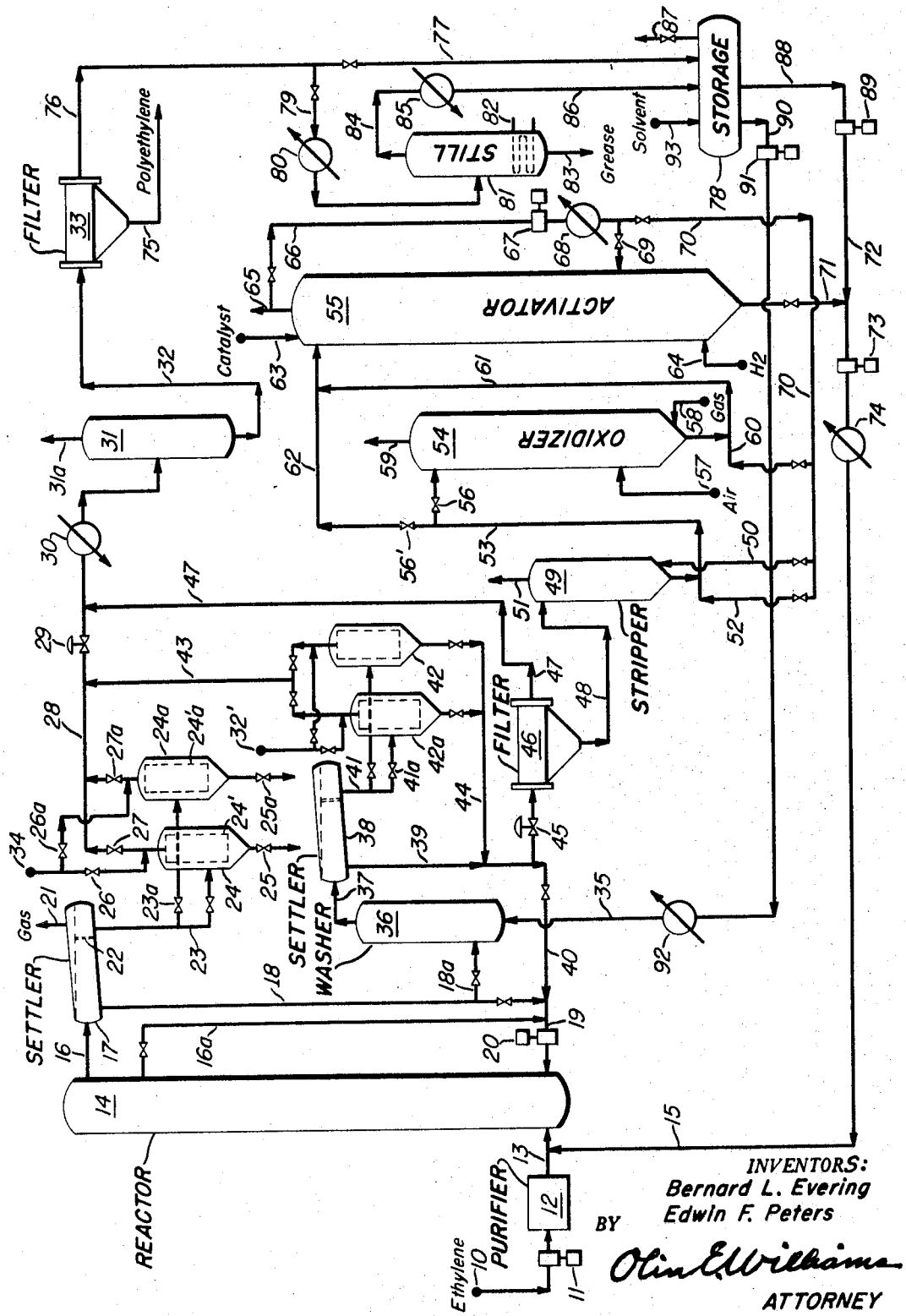

United States Patent Office

2,728,754

CONTINUOUS ETHYLENE POLYMERIZATION WITH CATALYST REGENERATION

Bernard L. Evering and Edwin F. Peters, Chicago, Ill., assignors to Standard Oil Company, Chicago, Ill., a corporation of Indiana Application May 17, 1952, Serial No. 288,516

7 Claims. (Cl. 260—94.9)

This invention relates to the production of normally solid ethylene polymers, herein called polyethylene, by means of solid molybdenum-containing catalysts and it pertains more particularly to an improved method of continuous operation for improving product uniformity.

The production of polyethylene by the polymerization of ethylene or mixtures of ethylene with other olefins such as propylene by means of solid molybdenum-containing catalysts is described at length in copending applications Serial Nos. 223,641 and 223,643, filed April 28, 1951, now U. S. Patents Nos. 2,692,257 and 2,692,258, and Serial No. 288,501, filed May 17, 1952, which is a continuation-in-part of Serial No. 223,641. The continuation-in-part application shows that when a catalyst is on stream for a prolonged period of time its activity gradually declines, but that such activity may be substantially restored by periodic activation with hydrogen; it also teaches that the catalyst may, after a number of on-stream and activation periods, require regeneration by combustion of carbonaceous deposits followed by reactivation. We have discovered that while such method of operation is effective for extending the catalyst life by keeping it active for a long period of time, it does not result in the production of uniform polymer products. At the beginning of the run the initially formed polymer is of relatively low specific viscosity, as hereinafter defined, and the specific viscosity of the product polymer gradually increases up to the time that the catalyst requires reactivation by hydrogen treatment. Reactivation will lower the specific viscosity of the formed polymer but will not lower it to the value of the said initially formed polymer and a gradual increase will again occur, thus raising the ultimate specific viscosity to an even higher value. Even if hydrogen reactivation is performed continuously, the specific viscosity of the polymer will gradually increase. In other words, the composition of the polymer product is not uniform but is constantly changing as the run progresses. An object of our invention is to provide a method and means whereby such a process may be continuously operated over long periods of time without any material change in the quality of the polymer product.

Furthermore, the rate of polymerization was not constant in the continuous processes heretofore described, which in turn made uniform operation of a product recovery system quite difficult. An object of our invention is to provide uniformity of polymerization rate, as well as uniformity of product composition and quality. A further object is continuously to produce polymers and copolymers of ethylene and propylene which will be of maximum utility for various commercial uses, such, for example, as the preparation of synthetic resins, for which a polymer uniform with respect to extensibility, extrudability, strength, etc. is of major importance.

An additional object is to avoid disintegration of catalyst particles to finely divided powder form since this results in undesirable variations in product quality and renders product recovery more difficult. Other objects will be apparent as the detailed description of the invention proceeds.

In practicing our invention we continuously introduce fresh makeup catalyst, reactivated (reduced) catalyst, and regenerated (oxidized and reduced) catalyst into the polymerization zone in a substantially uniform ratio in which the proportion of regenerated catalyst is maintained above at least a minimum, additional regeneration effecting no substantial change in the product polymer; and we continuously withdraw catalyst from the reaction zone at the same rate at which the total catalyst is introduced thereto, some of the withdrawn catalyst, if desired, being returned to the reactor without either reactivation or regeneration. Thus, the catalyst particles in the polymerization zone are maintained at a constant average activity and selectivity (which is the property of producing a uniform product) consisting of an equilibrium mixture of newly added catalyst particles, freshly reactivated catalyst particles, a minimum of freshly regenerated catalyst particles, and used catalyst particles. The average catalyst activity and selectivity remains constant because a constant proportion of the catalyst is reactivated and is recycled to the polymerization zone at a constant rate, and because at least the minimum proportion of recycled catalyst is regenerated that will restore the selectivity of the catalyst.

More specifically, we continuously remove catalyst from the polymerization zone, continuously reactivate a part of the withdrawn catalyst (after product has been removed therefrom) by treatment with a reducing gas such as hydrogen at a temperature in the range of about 400° to 650° C., preferably 425° to 475° C., for a time in the range of about 5 minutes to 5 hours, and under a pressure in the range of about atmospheric to 500 p. s. i. or more. Simultaneously, we regenerate a smaller amount of the withdrawn catalyst (also after product removal) by treatment with a free oxygen-containing gas such as air at a temperature in the range of about 450° to 700° C., preferably 550° C., for a period of about 10 minutes to 5 hours, or preferably 15 minutes to 1 hour at a pressure approximately the same as but slightly lower than that employed for the reactivation step, after which the oxidized catalyst is submitted to the reactivation treatment for completing its regeneration. By maintaining a substantially constant rate of catalyst flow through the reactivation zone, prior to reactivation, passing at least a minimum, minor, proportion of this catalyst through a regeneration zone, and returning the total catalyst at the same rate as catalyst is withdrawn from the polymerization zone, uniformity of polymerization rate, product molecular weight, and product quality is obtained.

It will be noted that the term "reactivation" as employed herein means the defined reducing treatment, and while hydrogen is the preferred reducing gas, reactivation may be effected by use of other reducing gases and even by the use of hydrocarbons. The term "regeneration" as employed herein means both the defined oxidation step and the subsequent reactivation step. For making the type of polymer useful as commercial resins, some of the withdrawn catalyst may be directly recycled without treatment, and some may be subjected to product removal and either be returned directly to the reactor or preferably be directed in major part to a reactivation step and, in minor part, to a regeneration step.

While the entire amount of withdrawn catalyst may be reactivated, particularly if catalyst is withdrawn from the polymerization zone at substantially the same rate as fresh and reactivated catalyst is introduced thereinto, if a large amount of catalyst slurry is removed from the polymerization zone and recycled to maintain an even distribution of the catalyst, a substantial proportion which may be less than half or preferably between about 5 and 40 percent by weight of the total recycled catalyst is continuously reactivated. In any case, between about 1 and 20 percent by weight of the recycled catalyst will be continuously regenerated. Recycled catalyst should be diverted to the oxidizing zone at a rate such that the total volume of employed catalyst will have been regenerated after having been on stream, or in use, for a period between about 10 and 100 hours. Regeneration of the catalyst is completed by reducing the oxidized catalyst to a subhexavalent state before it is returned to the polymerization zone.

The polymerization catalyst is a combination of alumina, titania, or zirconia with a molybdenum-oxygen compound in a subhexavalent state, in which each catalyst component is present in an amount of at least 1 percent, and in which the molybdena component is preferably between 5 and 25 percent. The alumina component should be in gamma form and of the type conventionally employed for the manufacture of hydroforming catalysts, the surface area of the alumina, titania, or zirconia component preferably being in the range of 40 to 400 square meters per gram as measured by nitrogen or n-butane adsorption (BET method). The particle size should be preferably of the order of 100 to 200 microns; larger particle sizes are advantageous from the standpoint of product removal if they can be handled by pumps and other equipment, and smaller particle sizes are advantageous from the standpoint of pumping and fluidization, but product removal therefrom may be somewhat more difficult. No novelty is claimed in the catalyst compositions and they are described in more detail in Serial No. 223,641, which also points out the necessity of activating them to ensure the presence of the molybdenum in a subhexavalent state. This activation may be effected by treatment with a reducing gas such as hydrogen at a temperature of about 400° to 650° C. under a pressure of about atmospheric to 500 p. s. i. g. or more for a time ranging from a matter of a few seconds to several hours, depending on the particle size and molybdena content; with particle size of about 100 to 200 microns the activation may be effected in about 1 to 15 minutes or more at a pressure of 50 to 200 p. s. i.

Generally speaking, the polymerization conditions and reaction media are likewise the same as taught in Serial No. 223,641. Polymerization should be at a temperature in the range of 75° to 325° C. and preferably about 130° to 300° C., under a pressure from 100 up to 5000 p. s. i. g., preferably about 200 to 2000 or about 1000 p. s. i. g., with a liquid hourly space velocity in the range of about .1 to 10 or preferably .5 to 5, e. g., about 2 volumes of olefin plus reaction medium charged per hour per volume of catalyst in the reactor at any time. The reaction medium is preferably an aromatic hydrocarbon such as benzene, toluene, xylene, etc. or mixtures thereof, or a saturated cyclic hydrocarbon such as tetralin or decalin.

The invention may be more clearly understood from the following detailed description of a specific example thereof, read in conjunction with the accompanying drawing, which is a schematic flow diagram of our improved polyethylene process.

Referring to the drawing, ethylene from source 10 is introduced by pump 11 to purification system 12 wherein it may be treated with reduced copper oxide and/or silica or alumina gel at a pressure slightly above 1000 p. s. i. g. and a temperature of about 40° C. in order to reduce its oxygen content to less than about 10 parts per million and to remove any other impurities which may be present. No invention is claimed in the purification system per se and any known ethylene purification system may be used.

About 2500 pounds per hour of purified ethylene are then introduced by line 13 to reactor 14 together with about 47,500 pounds per hour of solvent medium and 5600 pounds per hour of catalyst introduced through line 15, the temperature of the combined stream being about 230° C. and its pressure about 1000 p. s. i. The solvent medium in this case is a xylene mixture, although it should be understood that other aromatic solvents such as benzene or toluene and other types of solvents such as decalin may be employed. The charged stream thus consists of about 5.0 weight percent solution of ethylene in xylene, which under the defined conditions forms a substantially homogeneous solution.

The catalyst in this case is an alumina-molybdena composition originally containing about 10 weight percent molybdena, which catalyst has been previously activated to convert the molybdena to subhexavalent state. The catalyst particles are preferably spherical and their particle size is chiefly in the range of about 100 to 200 microns. In this example, 10 percent of the catalyst so introduced has previously been regenerated (oxidized and reduced) and about 90 percent has simply been reactivated by hydrogen treatment so that catalyst is introduced in this constant portion at a constant rate at the base of the reactor.

In this example, the reactor is a cylindrical vessel about 5 feet in diameter and about 25–30 feet in height through which the charging stock stream passes upwardly at a rate of about .01 to .02 foot per second. Since there is a tendency for the catalyst to slip or settle out of the upflowing liquid stream, the reactor will contain a large amount of catalyst, which in this example may be in the range of 25,000 to 50,000 pounds. The reactor is maintained at a pressure of approximately 1000 p. s. i. and a temperature of about 230° C., and under these conditions the weight space velocity will be of the order of about 1 to 2, the residence time of the charge being approximately 30 minutes and of the catalyst being about 4 to 10 hours. Polymer is produced on the surface of the catalyst and is at least partially dissolved therein in situ by the solvent medium. The reactor contents can be internally recycled through valved line 16a. Reactor effluent leaves the top of the reactor by line 16 to settler 17 carrying suspended catalyst at the same rate as that at which catalyst is introduced into the reactor so that the reactor at all times contains a substantially constant amount of catalyst with a constant ratio of reactivated and regenerated catalyst and a constant degree of overall catalyst activity.

In settler 17 the bulk of the catalyst settles as a pumpable slurry, which is withdrawn by line 18, and a part of which may be returned by line 19 and pump 20 to the reactor; if any catalyst is thus returned, a corresponding amount of catalyst will of course be withdrawn through line 16 over and above that amount introduced through line 15. Should any uncondensed gas accumulate in the settler it may be withdrawn through line 21.

The upper solvent layer from the settler flows over baffle 22 and is withdrawn through line 23 to high pressure filter 24 while valves 25 and 26 are closed and valve 27 is open so that the filtrate may pass through line 28, pressure reducing valve 29, and cooler 30 to separator 31, from which ethylene is removed by line 31a and may be recycled to source 10, the substantially ethylene-free liquid being introduced by line 32 to filter 33. The purpose of the cooling step is to throw the product polymer out of solution so that it may be separated from solvent by the low pressure filtration step.

When filter cake deposits on the filter element 24' and filter 24, the valve in line 23 is closed and the valve in line 23a is opened to divert the solution to filter 24a with valves 25a and 26a closed and valve 27a open. At this time valves 25 and 26 are opened while the valve in lines 23 and valve 27 are closed, and hot solvent from source 34 is employed to backwash the filter element 24'. The small amount of fine catalyst in the backwash is usually unsuitable for return to the reactor and will normally be discarded.

Hot solvent from line 35 is introduced into the base of washer 36, preferably at a temperature of about 200° to 400° C., e. g., about 250° C., and the slurry of catalyst in hot solvent is withdrawn through line 37 to settler 38, from which a pumpable catalyst slurry is withdrawn through line 39. Here again, if catalyst is withdrawn through line 16 more rapidly than it is introduced through line 15, a portion of the slurry may be recycled by lines 40, 19, and pump 20 to the reactor.

The hot solvent, with additional dissolved polymer, is withdrawn through line 41 to high pressure filter 42 or through line 41a to high pressure filter 42a, the filtrate passing by line 43 to line 28 and the catalyst slurry passing by line 44 to line 39. Here again backwash of hot solvent is employed from source 32'. Since the operation of these high pressure filters is substantially the same as that of filter 24 and 24a, no further description of valve change, etc., is necessary.

Since it is desirable to remove substantially all liquid from the catalyst which is to be regenerated and reactivated, at least a portion of the slurry from line 39 is introduced through pressure reducing valve 45 to filter 46, which may be of the rotating drum type enclosed in a pressure vessel and which may be operated at about atmospheric to 200 p. s. i. g., e. g., about 50 p. s. i. g. The amount of such slurry in this example is sufficient to remove to the filter about 5600 pounds per hour of catalyst (the carbonaceous deposit not being included in catalyst weight). The remaining hot solvent is withdrawn as filtrate through line 47 and returned downstream of pressure reducing valve 29 and prior to cooler 30. The filter cake from filter 46 is conveyed by a screw conveyor or other known means through line 48 into the upper part of stripper 49 wherein entrained and absorbed solvent is removed by hot hydrogen introduced by line 50, the gases and vapors withdrawn from the top of the stripper through line 51 being passed to a suitable solvent recovery system (not shown) which may be a charcoal absorber or other known means.

The free flowing dry catalyst solids from the base of the stripper are picked up by a hot carrier gas from line 52, which in this example is also hot hydrogen but which may be any inert gas, and the solids are carried by a gas lift through line 53 to the top of regenerator 54 and activator 55. In this case the amount of solids going to regenerator 54 is about 10 percent of the total stream, and valves 56 and 56' are set accordingly.

The regenerator 54 is maintained at a temperature in the range of about 450° to 650° C., e. g., 550° C., by air introduced through line 57 at a point spaced from the bottom of the oxidizing zone. Cool inert gas is introduced by line 58 at the bottom of the oxidizing zone to strip out entrained oxygen, cool the oxidized catalyst to the approximate temperature required for activation (reduction) and to dilute the air stream in the upper part of the zone and thus avoid overheating of the catalyst in the oxidizing zone, the flue gas being removed from the top of the regenerator through line 59. The inert gas may be nitrogen, carbon dioxide, or cooled flue gas, although for some catalysts steam may be employed. The relative amounts of air and inert gas will depend, of course, upon the amount of carbonaceous deposits to be removed and may vary within relatively wide limits. The upward velocity of the gas need not be high enough to effect fluidization, since a large amount of inert gas can carry away most of the heat of oxidation. Temperature control may be effected in oxidizer 54 in any manner commonly employed, for example, in the cooling of moving bed or fluidized reactors.

Hot oxidized catalyst is picked up from the base of oxidizer 54 by hot hydrogen introduced through line 60 and carried by line 61 to the upper part of activator 55 together with that portion of the unregenerated catalyst which is introduced to the activator through valve 56' and line 62. Makeup catalyst may also be introduced in the upper part of activator 55 through line 63; in other words, the makeup catalyst may be initially activated in this chamber while recycled catalyst is being reactivated therein. The makeup hydrogen required for effecting activation is introduced at ordinary temperature at the base of the activator through line 64. Since heat is required to effect activation, a part of the hydrogen withdrawn from line 65 is recycled through line 66 by pump 67 through heater 68 and reintroduced through line 69 at a point in the activator above the base thereof.

Hydrogen is preferably introduced through the said line 64 at a temperature that will cool the reactivated catalyst to about polymerization temperature (230° C.) in the section below pipe 69. Hydrogen will adsorb on the catalyst and will have the effect of modifying the specific viscosity of the polymer so that this cooling treatment will also contribute toward maintaining a uniform product. Catalyst containing adsorbed hydrogen will tend to produce polymer having a lower specific viscosity.

Activation in this case is effected at a pressure slightly below 50 p. s. i. g. with the holding time of the catalyst in the activator being about 1 minute to an hour or more but not more than about 5 hours (e. g., about the same length of time as employed in the oxidizer, approximately 30 minutes). The activator is operated at about 400° to 650° C., preferably between about 425° and 475° C., or approximately 450° C.

An additional portion of the recycled hot hydrogen from line 70 may be employed for supplying the gases introduced through lines 50, 52, and 60.

Hot catalyst withdrawn through line 71 from the base of the activator is picked up by solvent from line 72 and passed by pump 73 and heat exchanger 74 to line 15 for reintroduction to the reactor. Heat exchanger 74 should be operated to bring the slurry to such temperature that when it is admixed with ethylene from line 13 the total mixture will be approximately 230° C.

Referring now to the product stream which has been cooled in heat exchanger 30 to a temperature of the order of about 10° to 50° C., e. g., about 30° C., this cooling precipitates the polymer as an insoluble phase in the solvent and the polymer is separated from the solvent in continuous rotary filter 33. The polymer product on the filter may be washed with clean solvent for removing low molecular weight materials (grease) which might alter the desired properties of the finished product. The washed solid is withdrawn through line 75 and is heated under reduced pressure to recover the solvent, which is returned to solvent storage for use in the process.

The filtrate is withdrawn from filter 33 through line 76 and most of it may be introduced by line 77 to solvent storage 78. However, to avoid any tendency toward buildup of low molecular weight materials (herein called grease) from the circulating solvent, a side stream is withdrawn through line 79 and heater 80 to still 81 which may be provided with reboiler 82, the so-called "grease" being withdrawn through line 83 and the purified solvent being taken overhead through line 84, condensed in cooler 85, and returned by line 86 to storage vessel 78. Any gas which may accumulate in the storage vessel can be withdrawn through line 87. About 47,500 pounds per hour of solvent are withdrawn from the storage vessel through line 88 by pump 89 to line 72 for picking up activated, regenerated, and reactivated catalyst for recycle. Another portion of the solvent, e. g., about 5000 to 30,000 pounds per hour, is withdrawn through line 90 by pump 91, heated in heater 92 to the temperature required in washer 34, and employed for recovering additional product from the catalyst before the catalyst is subjected to regeneration and reactivation.

Makeup solvent introduced to storage from source 93 should be deaerated and the solvent recycled through line 72 should likewise be deaerated as it becomes aerated in the course of operation.

While we have described in detail a specific example of our invention, it should be understood that many alternative arrangements and modifications will be apparent from the above description to those skilled in the art. For example, screw conveyor 48 may introduce the wet solids directly into the top of activator 55 and about 10 percent of the solids from the base of the activator may be introduced into the oxidizer and returned from the oxidizer to the activator. The recycled hydrogen may be introduced through line 69 at a point near the base of the activator and cooling coils may be employed at the bottom of the activator if the catalyst at this point is too hot to be introduced into the solvent stream from line 72.

Propylene and other low molecular weight olefins will copolymerize with ethylene according to our process to produce useful copolymers, and propylene alone will polymerize to produce useful polypropylenes. Reduced cobalt molybdate, which is a subhexavalent molybdenum-oxygen compound, is especially suitable for the polymerization of propylene and ethylene-propylene mixtures.

The operation of our improved process results primarily in the production of ethylene polymers having specific viscosities between about $8000 \times 10^{-5}$ and $60,000 \times 10^{-5}$ with variations of a single product usually not greater than about $2000 \times 10^{-5}$ and an over-all average of a single product that is substantially uniform. The specific viscosity values were obtained by employing the Staudinger formula (Phys. Chem. 171, 129 (1934)), using 0.125 gram of polyethylene per 100 ml. of boiling xylene at 85° C. for viscosity measurements, and are the values which define the range of commercially suitable polyethylenes. The specific viscosity of polyethylene is a readily determined physical characteristic that will measure the suitability of the polymer, and changes in specific viscosity are probably indicative of parallel changes in molecular weight. Thus our process equally results in maintaining a substantially uniform molecular weight.

Having described our invention, we claim:

1. In a process for polymerizing ethylene with a solid catalyst comprising essentially at least 1 weight per cent each of molybdenum oxide and a metal oxide selected from the class consisting of gamma-alumina, titania and zirconia, which catalyst has been treated with hydrogen at a temperature of about 400 to 650° C. for a time sufficient to effect substantial activation thereof, in a polymerization zone at a temperature in the range of 75 to 325° C. and at a pressure in the range of 100 to 5,000 p. s. i. g. wherein contact between ethylene and catalyst is effected in the presence of a solvent, the improved method of operation which comprises continuously withdrawing from the polymerization zone an effluent stream containing polymer and catalyst, separating catalyst from the withdrawn stream, regenerating a first portion of the separated catalyst by burning carbonaceous deposits therefrom with oxygen, treating the regenerated catalyst and also treating a second portion of the separated catalyst without regeneration by contacting the regenerated first portion and the unregenerated second portion with hydrogen at a temperature of about 400 to 650° C. for a time sufficient to effect substantial reactivation thereof and continuously returning reactivated catalyst to the polymerization zone.

2. The method of claim 1 which includes the step of returning a third portion of the separated catalyst to the polymerization zone without regeneration and without reactivation.

3. The method of claim 1 which includes the step of washing separated catalyst with hot solvent in order to remove polymer therefrom.

4. The method of claim 1 which includes the step of controlling the amount of catalyst subjected to regeneration relative to the amount treated with hydrogen without regeneration to maintain the average catalyst activity and average catalyst selectivity in the polymerization zone substantially constant.

5. The method of making normally solid polyethylene which comprises continuously introducing into a polymerization zone ethylene dissolved in a solvent and a catalyst, said catalyst having a particle size of approximately 100 to 200 microns and comprising essentially at least 1 weight per cent each of molybdenum oxide and a metal oxide selected from the class consisting of gamma-alumina, titania and zirconia, said catalyst being partially reduced by treatment with a reducing gas at a temperature of about 400 to 650° C. for a time sufficient to effect substantial activation thereof, contacting said ethylene with said activated catalyst in the presence of said solvent at a pressure in the range of about 200 to 2,000 p. s. i. g. at a temperature in the range of about 130 to 300° C. with a weight space velocity of about .1 to 10 pounds per hour of solvent plus ethylene per pound of catalyst in the reactor, the introduced mixture containing about 1 to 10 weight per cent ethylene, continuously withdrawing from the polymerization zone an effluent stream containing solvent, polymer and catalyst, continuously separating catalyst from said effluent stream, regenerating a minor part of the separated catalyst by contact at an elevated temperature with a gas containing uncombined oxygen under conditions for effecting combustion of carbonaceous deposits and oxidation of the catalyst, treating the regenerated catalyst and also treating a larger portion of the separated catalyst with a reducing gas comprising hydrogen at a temperature of about 400 to 650° C. for a time sufficient to effect substantial reactivation both of the regenerated portion of the catalyst and the larger separated portion which was not subjected to regeneration and continuously returning reactivated catalyst to the polymerization zone.

6. The method of claim 5 wherein the proportion of catalyst subjected to regeneration is about 1 to 20 per cent by weight of the total separated catalyst.

7. The method of claim 5 which includes the step of maintaining the catalyst particles in the polymerization zone at substantially constant average activity and selectivity by controlling the ratio of regenerated catalyst to unregenerated catalyst which is subjected to the reactivation treatment with the reducing gas.

References Cited in the file of this patent

UNITED STATES PATENTS

| | | |
|---|---|---|
| 2,572,300 | Arnold et al. | Oct. 23, 1951 |
| 2,634,260 | Carnahan | Apr. 7, 1953 |
| 2,658,059 | Peters et al. | Nov. 3, 1953 |